US008245203B2

(12) United States Patent
Becker

(10) Patent No.: US 8,245,203 B2
(45) Date of Patent: Aug. 14, 2012

(54) LOGGING SYSTEM AND METHOD FOR COMPUTER SOFTWARE

(75) Inventor: Daniel C. Becker, Denville, NJ (US)

(73) Assignee: Alcatel Lucent, Paris (FR)

( * ) Notice: Subject to any disclaimer, the term of this patent is extended or adjusted under 35 U.S.C. 154(b) by 1444 days.

(21) Appl. No.: 11/771,986

(22) Filed: Jun. 29, 2007

(65) Prior Publication Data

US 2009/0007065 A1 Jan. 1, 2009

(51) Int. Cl.
*G06F 9/45* (2006.01)
(52) U.S. Cl. ...................................................... 717/140
(58) Field of Classification Search .................... 717/140
See application file for complete search history.

(56) References Cited

U.S. PATENT DOCUMENTS

| 6,324,546 | B1 * | 11/2001 | Ka et al. .......................... 717/170 |
| 6,539,501 | B1 * | 3/2003 | Edwards ........................ 717/128 |
| 6,574,792 | B1 * | 6/2003 | Easton ........................... 717/142 |
| 7,216,336 | B1 * | 5/2007 | Ezra et al. ...................... 717/124 |
| 7,512,613 | B2 * | 3/2009 | Taitel ............................ 717/135 |
| 7,584,338 | B1 * | 9/2009 | Bricker et al. ................. 711/162 |
| 7,900,198 | B2 * | 3/2011 | Kasman ......................... 717/158 |
| 2005/0015751 | A1 * | 1/2005 | Grassens ........................ 717/130 |
| 2005/0160427 | A1 * | 7/2005 | Ustaris .......................... 718/100 |
| 2006/0259830 | A1 | 11/2006 | Blevin et al. |
| 2007/0006172 | A1 * | 1/2007 | Swoboda et al. .............. 717/131 |
| 2007/0006174 | A1 * | 1/2007 | Sohm et al. .................... 717/131 |
| 2007/0234300 | A1 * | 10/2007 | Leake et al. ................... 717/124 |
| 2008/0082967 | A1 * | 4/2008 | Kasman ......................... 717/124 |
| 2008/0148231 | A1 * | 6/2008 | Weber ........................... 717/120 |

OTHER PUBLICATIONS

Simao et al, "A Language for the Description of Program Instrumentation and Automatic Generation of Instrumenters", CLEI Electronic Journal, Dec. 2003, vol. 6, No. 1, Paper 7.*
Spinellis, "Debuggers and Logging Frameworks", 2006, IEEE.*
Gunter et al, "Log Summarization and Anomaly Detection for Troubleshooting Distributed Ssytems", 2007, IEEE.*

* cited by examiner

*Primary Examiner* — Wei Zhen
*Assistant Examiner* — Junchun Wu
(74) *Attorney, Agent, or Firm* — Hitt Gaines, PC

(57) ABSTRACT

The present invention provides a computer-implemented method to generate a logging dictionary for a compilation of a source code that has a logging statement and associated source code static data, comprising: selecting part of the source code that includes the logging statement; determining source code static data associated with the logging statement; generating a combined data element from the associated source code static data; correlating the combined data element with the logging statement; wherein if the combined data element does not occur in the logging dictionary correlated to said logging statement; assigning a log index value to the combined data element; and adding the log index value, correlated to the logging statement, to the log dictionary.

19 Claims, 4 Drawing Sheets

LOGGING SYSTEM AND METHOD FOR COMPUTER SOFTWARE

TECHNICAL FIELD OF THE INVENTION

The present invention is directed, in general, to generating compact logs and, more specifically, to generating modified software that generates compact logs.

BACKGROUND OF THE INVENTION

Many software-based products generate text-based logs of various operational details, such as errors, for a purpose of monitoring computer systems and also for employment as an aid in trouble-shooting these systems. These software-based products can provide an ability to adjust an amount of operational details logged.

A typical approach to generate an amount of data to be logged ("log data") employs use of a "print" statement, such as "fprintf" in the "C" programming language, in source code. These print statements specify both as what data gets logged, including static (non-variable) and dynamic (runtime variable) data, and also further include the format in which the log data is to be printed. These approaches can require significant system processing time and storage.

One method of reducing storage required for these logs is to utilize common compression tools (e.g., "compress", "gzip", "winzip") to compress the text data, generated by the print statements, after it has been generated. This solution may help with the storage of the log data, but is actually more expensive in terms of computer time, since the compression adds an additional processing step.

An approach to reducing the amount of data logged is to generate a key to represent the static data, such as an arbitrary but unique number, and log the key and dynamic data values instead of the original text log data. For instance, an "fprintf ("error in Memory Area % d", errNo)" where the format string "error in Memory Area % d" and the name, type, and size of the variable "errNo" would be keyed as a key 4678 to represent the static information, and the current value associated with the name "errNo" is dynamic and is generated at runtime and had the value 53 at runtime. 4678, 53 would then be output to an error log in binary form.

Thus, the generation of log data is useful in monitoring and trouble-shooting computer systems. Accordingly, improvements and generating and recording log data would be beneficial.

SUMMARY OF THE INVENTION

The present invention provides, in one embodiment, a computer-implemented method to generate a logging dictionary for a compilation of a source code that includes one or more logging statements with referenced static and dynamic data. The present invention further provides, in one embodiment, a computer-implemented method for generating a log index value that enables a write to a log within source code that has a logging statement and associated source code static and dynamic data. The present invention still further provides, in one embodiment, a preprocessor system for modifying source code to write an alternative log containing log index values and dynamic values.

The computer-implemented method to generate a logging dictionary for a compilation of a source code that has a logging statement and associated source code static data comprises: selecting part of the source code that includes the logging statement, determining source code static data associated with the logging statement, generating a combined data element from the associated source code static data, and correlating the combined data element with the logging statement. If the combined data element does not occur in the logging dictionary correlated to the logging statement, assigning a log index value to the combined data element, and adding the log index value, correlated to the logging statement, to the log dictionary.

The present invention further provides, in one embodiment, a computer-implemented method for generating a log index value that enables a write to a log within source code that has a logging statement and associated source code static data, comprising: selecting part of a source code that includes the logging statement, determining associated source code static data associated with the logging statement, generating a combined data element from the associated source code static data, correlating the combined data element with the logging statement, determining a log index value associated with the correlated combined data element and the logging statement, and enabling a write, to a log, of the log index value in the source code.

The present invention further provides a preprocessor system for generating a log-index value, comprising: a) a logging statement identifier configured to: distinguish a logging statement from a non-logging statement in source code; and parse source code, associated with the source code, further into: i) associated source static data, and ii) associated static variable name data, and b) a logging dictionary generator, configured to: i) combine the associated static information to form a combined data element; ii) generate a log index value that acts as a key for the combined data element, and iii) store the log index value and the combined data element into a coupled logging dictionary.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
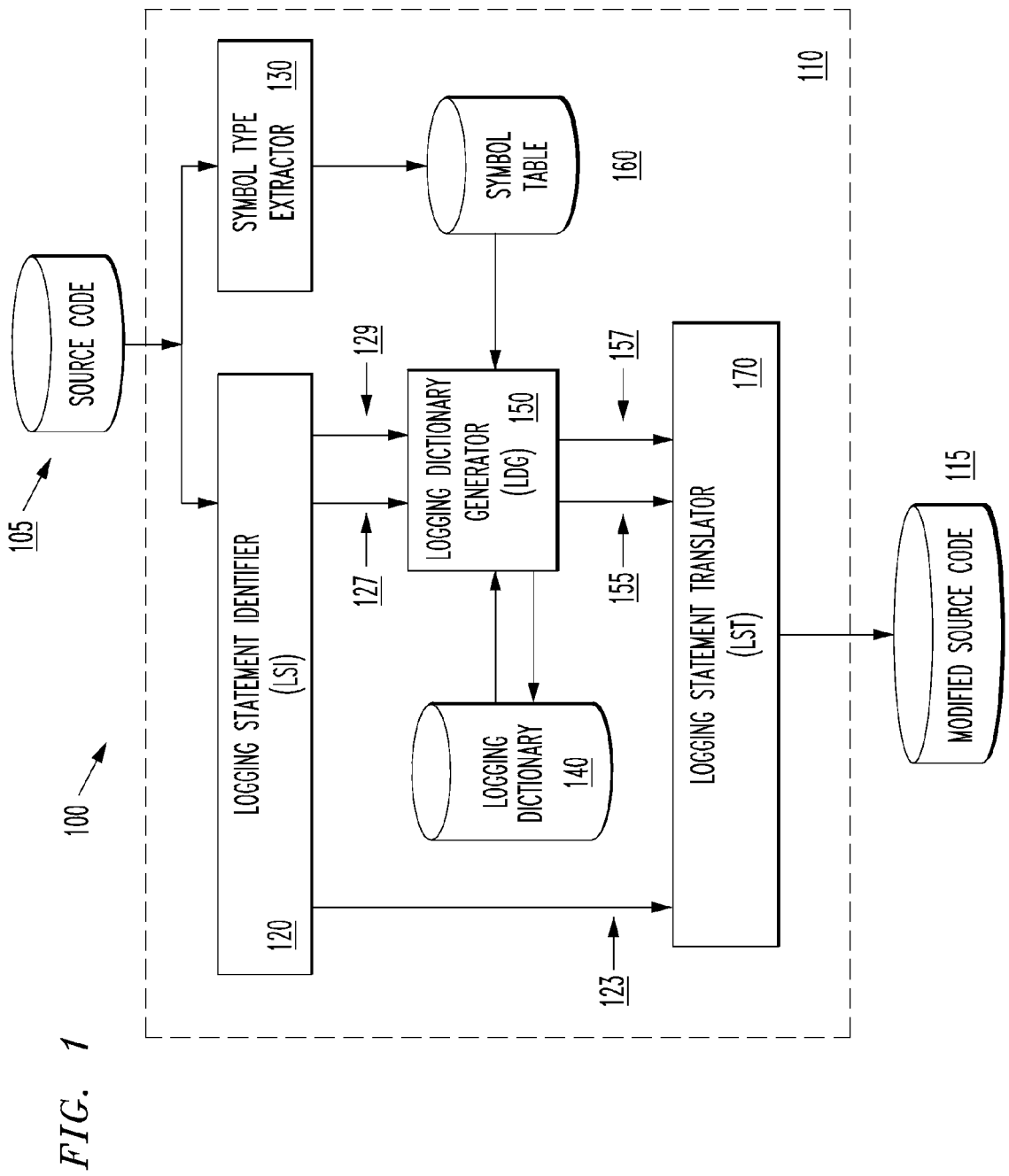
FIG. 1 illustrates a diagram of an embodiment of a system 100 for generating modified source code utilizing an inserted log index value and dynamic data values constructed according to the principles of the present invention.

Referring initially to FIG. 1, illustrated is a diagram of an embodiment of a system 100 to insert a log index value and static data values constructed according to the principles of the present invention. Generally, the system 100 generates static data values associated with static fixed strings and variable names contained within logging statements associated with source code, that, together with the log index values, can be associated with a logging dictionary to represent important, perhaps essential, data contained within the logging statements.

In the system 100, a source code 105 is coupled to a preprocessor 110. The preprocessor 110 has a logging statement identifier ("LSI") 120 and a symbol type extractor 130 both coupled to an input that accepts the source code 105. The logging statement identifier ("LSI") 120 is coupled to a logging statement translator 170 ("LST"). The LSI 120 is coupled to a logging dictionary generator ("LDG") 150 through a static branch 127 and a dynamic branch 129. The symbol type extractor 130 is coupled to a symbol table 160. The symbol table 160 is also coupled to the LDG 150. The LDG 150 is also coupled to the LST 170 through a log index value branch 155 and a dynamic value branch 157. The LST 170 has an output, which is a modified source code 115.

In the system 100, the source code 105 could be in any of a number of programming languages, such as "C", "C++", "C#", and so on, although other languages are within the scope of the present invention. The output of the preprocessor 110 is modified source code 115, which is a copy of the input source code 105, but with its logging statements replaced or supplemented with logging statements that log less log data, but is still enough log data, when used with the logging dictionary, to functionally reproduce the output of the original, unmodified logging statements.

Generally, the system 100 is configured to generate both a logging dictionary 140 and the modified software 115 itself. The LSI 120 searches through the unmodified source code 105, performing matches to distinguish logging statements from all other source code statements 123, which are sent to the LST 170. The LSI 120 then parses associated source code logging source code statements to extract static data specified with the logging statements. Logging statements to be inserted into the modified software 115 are selected within LSI 120 of the preprocessor 110.

As referenced above, once logging statements that correlate to the selected logging statements are discovered in the source code 105, the LSI 120 then interprets the intent of these logging statements into two types of static data: fixed text and format information, and names of variables that are used at runtime to store dynamic data. Static data may generally be defined as time invariant data that does not change whenever a given print/output occurs for a given line of code, as will be detailed below. Static data could also correlate to a context of a system. In other words, the functional processing state of a system at a particular point in time. Dynamic data may generally be defined as time variant data that potentially changes each time a given print/output occurs for a given logging statement line of code. Dynamic data is associated with a variable name specified in logging statements, whereby the name itself is static, but the data associated with the variable name is dynamic.

Then, generally, the system 100 inserts a revised logging source code statement into source code in the source code 115 to replace the original logging source code statement. The revised logging source code statement specifies a "logging index value" and the names, types, and sizes of the associated variable names representing runtime dynamic data, derived from the associated static data of the original selected logging source code statement. This revised logging source code statement can be used as an alternative to the original print statement. Therefore, both types of numbers (i.e., the logging index value and the dynamic values associated with the static variable names) will be created in a log when running the modified source code 115.

One example of such a logging statement in the C programming language to be found in the source code 105 might be:
fprintf (LOG, "time: % d file: % s line: % d Error occurred while processing message from % d\n", time( ), _FILE_, _LINENO_, user);

In this example, the static data includes the name of the file descriptor (LOG), the format specification, the static values _FILE_ and _LINENO_ information, and the names and sizes of the variables (time( ) and user) used to represent future dynamic values.

In the above example, the static data includes the file descriptor name LOG, the format specification, the _FILE_ and _LINENO_ information, and the names and sizes of the variables (time( ) and user). In one embodiment, the LSI 120 can be configured to search for all the static data as a single logging statement.

In some embodiments, the LSI 120 sends to the LST 170, a stream of source code 123 that leaves of all non-logging source code statements intact, and a placeholder where the logging source code statements are to be replaced with a modified logging source code statement to log only the log index value and the dynamic values represented by the static variable names.

In some embodiments, the symbol type extractor 130 executes on the unmodified source code 105, input in parallel with the LSI 110, to identify variable names and their types and sizes in a manner similar to a language compiler. Typically, the LDG 150 obtains the type and sizes of the variable names identified in the logging statement from the LSI from the Symbol table 160. The total information (static data including variable names, and the types and sizes of the data associated with the variable names) is passed to the LST to generate the modified logging statements in the LST 170. The names, types, and sizes of the variables are then stored in the symbol table 160 to be used by the LDG 150.

The LDG 150 accepts the static data from the static line 127 and static variable names representing non-static information over the line 129 from the LSI 120. The LDG 150 also retrieves variable type and size information from the symbol table 160, based on the static variable names. As will be detailed below, both of these sets of information are used to generate a "combined data element" intrinsically containing the static information received from the static information from the LSI 120. In some further embodiments, the combined data element further intrinsically contains the static information received from the symbol table 160.

In one embodiment, static information from the LSI 120 over static line 127 and non-static 129 only includes the names of variables from the logging statement (as well as static fixed data) Typically, it is not possible to get the sizes and types from only the logging statement. The types and sizes of variables associated with those names is typically defined in a completely different file, hence the need to parse and interpret the entire source code stream 105 to store the types and sizes along with the names in the symbol table. In some embodiments, lines 127 and 129 paths are combined into a single line, and all static data is conveyed to the LDG, without a differentiation between fixed static data and static variable names by the LSI 120.

After receiving both static information over the static branch 127, and in some further embodiments, also including the associated symbol information containing format, names, size and type information, line number, etc. from the symbol table 160, the LDG 150 then creates the "combined data element" from the associated source code static data and the symbol data. For example, the static data above could be combined by aggregated together to create a combined data element, although other types of combinations are also within the scope of the present system. The combined data element is also associated with its logging statement.

Then, the LDG 150 determines whether the logging dictionary 140 contains an entry that has the same combined data element entered under the associated logging statement. If the logging dictionary 140 does not have the same combined data element entered under the associated logging statement, the LDG 150 generates a logging index value that serves as a key to the logging dictionary 140 for that combined data element. The logging index value is typically unique for a given software code. The LDG 150 then stores the logging index value and its correlated static data element into the logging dictionary 140. However, if the combined data element is found in the logging dictionary 140 under the selected logging statement, the LDG 150 retrieves the corresponding logging index value of that combined data element.

In one aspect, only the combined data element and the index key value are stored in the logging dictionary 140. This entry in the logging dictionary 140 does not contain or directly reference the logging statement, but that information is passed to the LST 170 to generate the equivalent modified logging statement. The index key value is printed to the log (along with dynamic data) by the modified source code 115 logging statement. When it comes time to "uncompress" the log, the index key is employed to lookup the combined data element to see how the original statement would have printed the equivalent log entry.

Then, in one embodiment, the original logging statement is discarded, unless another embodiment (option) of including both the original logging statement and the modified logging statement in modified source code 115 is included, so as to permit the choice of what type of log entry is desired (i.e., an original or compressed) at runtime. Generally, the original logging statement only contains static data, which is extracted and contained in the logging dictionary. That static data is sufficient to recreate the original logging statement functionality, when used with the dynamic data that gets logged with the index key. Generally, the combined data element is used to recreate the original logging statement when it comes time to examine the log.

Then, regardless of whether the logging index value was generated at that time by the LDG 150 or, alternatively, retrieved from the logging dictionary 140, the LDG 150 passes the logging value index of the combined data element, and the names of the static variable names used to retrieve dynamic data at runtime, received over the dynamic branch 127, to the LST 170.

The LST 170 then generates a source code statement that enables a write to a desired log, having the logging index value, and the dynamic data represented by the variable names. The write that is enabled employs the logging index value and the contents of the variable names. An enabled write of the logging index value and the variable names are merged with the source code stream, thereby replacing the logging placeholder received from the LSI 120. In some further embodiments, this can generate a modified version of the original source code, the modified source code 115. In some embodiments, the above is performed within a binary version of the modified source code.

Generally, employment of the system 100 allows a creation of a compact write of error information. Furthermore, employment of the system 100 allows for an automatic update to the logging dictionary 140, alleviating the intervention of a human for specific searches of the static data associated with the logging statements.

Instead, in the system 100, specific searches for multipurpose logging statements that contain: a) logging codes, such as in ASCII format, logging strings (such as "error in printer #6"), or logging strings with additional static information (such as "error in printer #6", along with "C" format printing and line information), can be programmed by a human into the LSI 120, with the system 100 indexing all of the other associated static information found with the logging statement, to enable a compact output, such as a write of information.

Figure 2A:
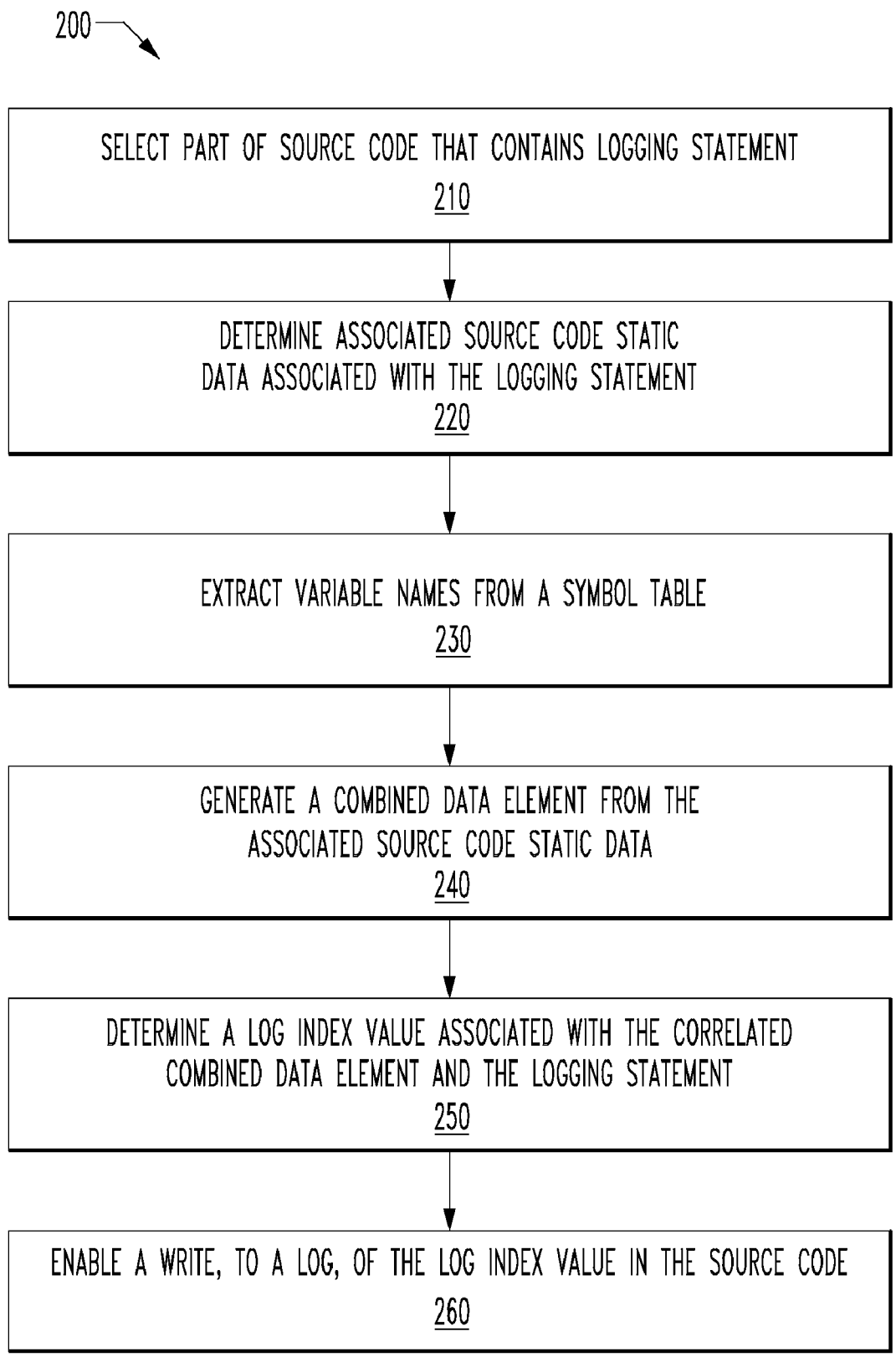
FIG. 2A illustrates a flow diagram of an embodiment of a method for generating an inserted log index value and dynamic data values carried out according to the principles of the present invention.

Turning now to FIG. 2A, illustrated is a flow diagram of an embodiment of a method 200 for inserting a log index value and variable names into source code. The method 200 can generate modified source code. The method can be computer-implemented. Although method 200 is discussed below in reference to the system embodied in FIG. 1, this is for purposes of ease of explanation, and is not intended to limit the method.

In a step 210, a part of the source code that contains a logging statement is selected. In one embodiment, in the system 100, the LSI 120 can be configured to identify a particular logging statement, such as "Error occurred while processing message from", although other static information may be defined to be part of the logging statement as well.

In a step 220, static data in the source logging statement code is determined and extracted. In one embodiment, in the system 100, the LSI 120 can be configured to identify associated source code static data associated with the logging statement, such as a log file descriptor, format information and variable names that are used to reference dynamic data defined at runtime.

In a step 230, in one aspect, the variable names extracted in step 220 are used to extract from a symbol table, the static size and type information of those variable names. Generally, the combined data element is the correlation, which is represented by the data index.

In a step 240, a combined data element is generated from at least the associated source code static data. In some embodiments, symbols are also used to generate the associated source code static data. In one embodiment, in the system 100, the LDG 150 generates the combined data element.

In a step 250, a log index value, associated with the correlated combined data element and the logging statement, is generated. In some embodiments, this can occur by the LDG 150. In some embodiments, log index value is written to a logging dictionary 140 during a generation of the modified source code 115.

In a step 260, a write to a log is enabled with the log index value and variable names within the source code. This generates modified source code. In some embodiments, the LST 170 enables an outputting, such as a write in a source code 105 to generate modified source code 115. In some embodiments, a variable name is appended to the log index value within the modified source code 115. In some embodiments, source code static data and the original logging statement is deleted from the source code.

Figure 2B:
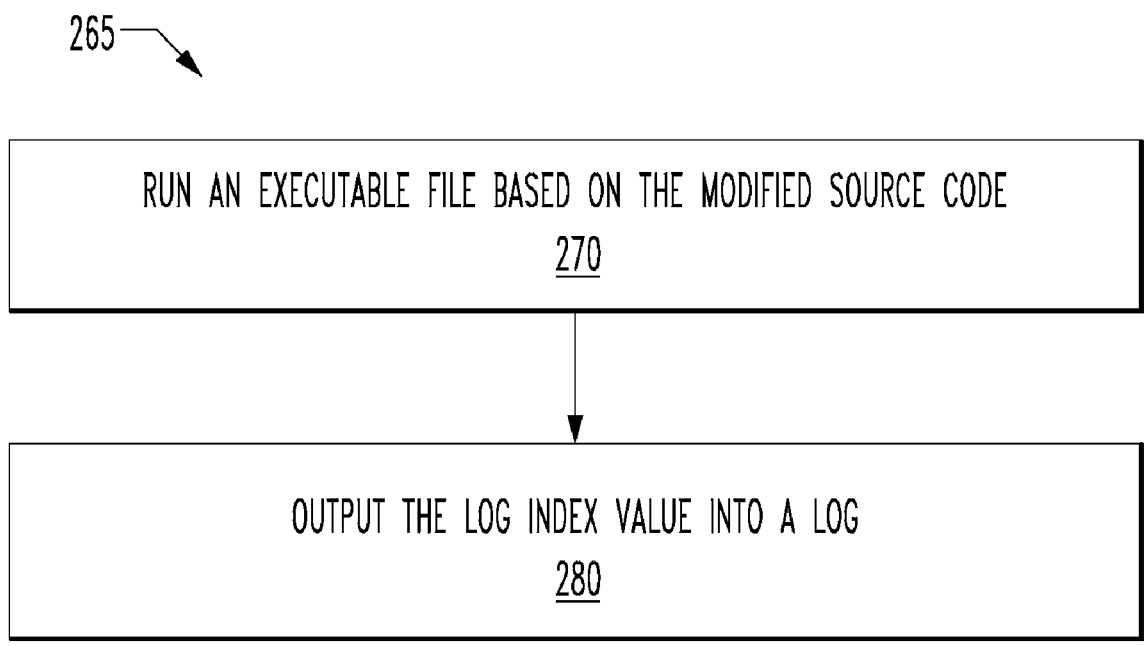
FIG. 2B illustrates a flow diagram of an embodiment of a method for outputting a log output value into a log that is generated by an inserted log index value carried out according to the principles of the present invention.

Turning now to FIG. 2B, illustrated is a flow chart of an embodiment of a method 265 constructed according to the principles of the present invention. The method 265 illustrates an employment of modified source code, such as modified source code generated in the method 200.

In a step 270, an executable file, based upon the modified source code, such as modified source code 315, is generated and executed. The method can be computer-implemented.

In step 280, as a result of running the executable file based on the modified source code, a log index value is outputted into a log. In some embodiments, dynamic data associated with said log index number is outputted into the log.

In some further embodiments, the log index value, correlated to the combined data element, is employed to convert into human-readable log the static data and the associated dynamic data that were also output into the compressed, binary log. For instance, the binary log could read 45678 3456, which could be interpreted as "Error in memory location 3456", although the log index value 45678 may also contain formatting information that would enable the value 3456 to be interpreted as some other value by a human. This can be performed by a different executable program, (i.e., not the same one in step 270) that reads the output log, and with the logging dictionary, does the converting of the binary log into something that is readily human understandable (e.g., in ASCII text format, as opposed to binary format).

Figure 3:
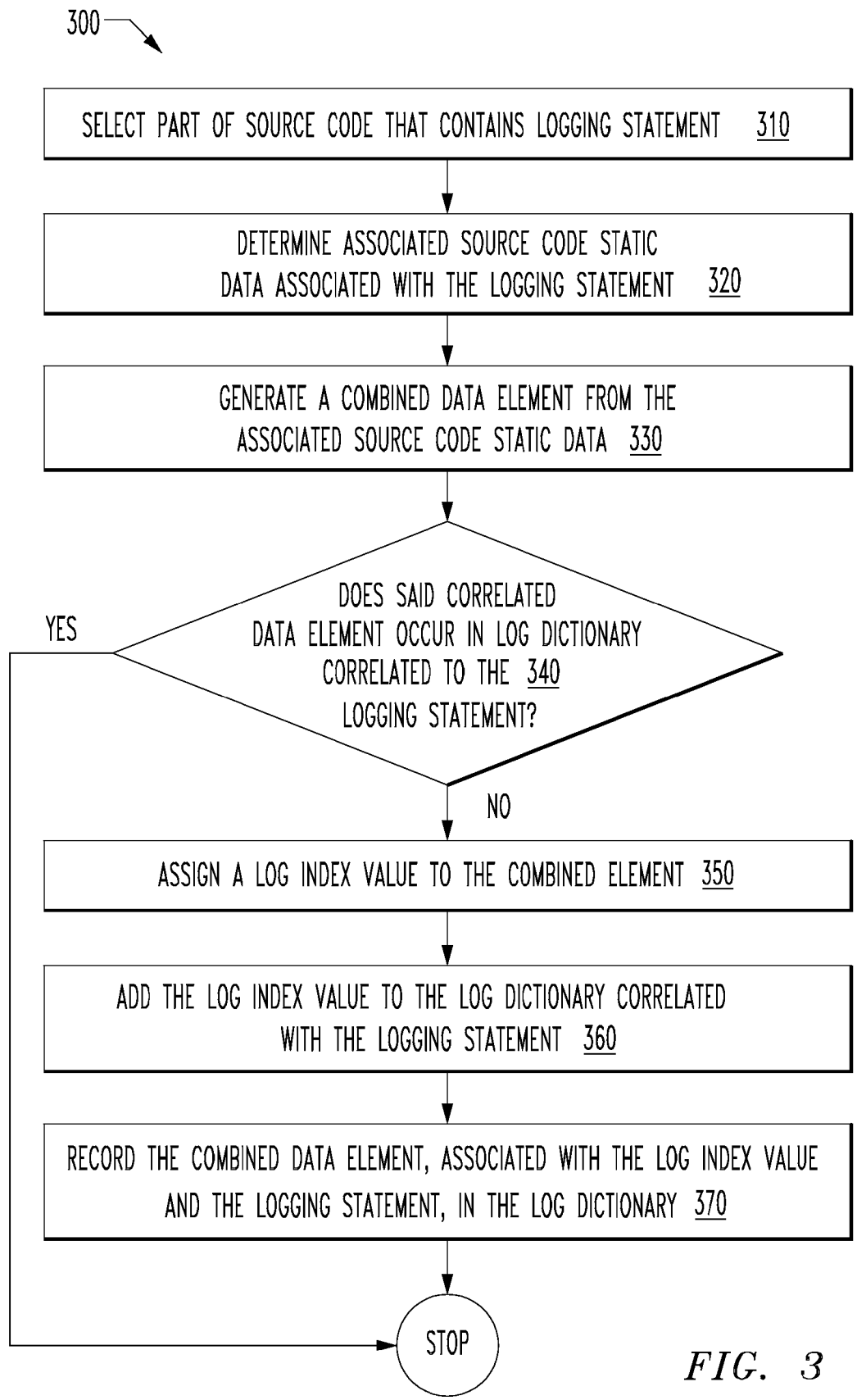
FIG. 3 illustrates a flow diagram of an embodiment of a method for updating a logging dictionary with log index values carried out according to the principles of the present invention.

Turning now to FIG. 3, illustrated is a flow diagram of an embodiment of method 300 for generating a logging dictionary constructed according to the principles of the present invention. In one embodiment, this can be the logging dictionary 140 of the system 100.

In a step 310, a part of the source code that contains a logging statement is selected. In one embodiment, in the system 100, the LSI 120 can be configured to identify a particular logging statement, such as "Error occurred while processing message from", although other static information may be defined to be part of the logging statement as well.

In a step 320, static data in the source code is identified, and associated with the logging statement. In one embodiment, in the system 100, the LSI 120 can be configured to identify associated source code static data associated with the logging statement, such as a "log file descriptor" and format information.

In a step 330, a combined data element is generated from at least the associated source code static data. In some embodiments, symbols are also used to generate the associated source code static data. In one embodiment, in the system 100, this LDG 150 generates the combined data element.

In a step 340, the method 300 determines whether or not the combined data element is found in the log dictionary. In some embodiments of the method 300, the LDG 150 checks for the combined data element in the logging dictionary 140. If the combined data element does occur in the logging dictionary 140, then the method 300 stops. However, if the correlated data element does not occur in the logging dictionary 140, the method advances to step 360.

In a step 350, a log index value is assigned to the combined data element. In some embodiments, assigning a log index value to the combined element occurs in the logging dictionary generator 150.

In a step 360, the log index value is added and indexed in the log dictionary. In some embodiments, the LDG 150 adds the combined data element and its corresponding log index value to the logging dictionary 140. In one aspect, the original logging statement is deleted, and combined data element contains all the critical information from the original statement.

In step 370, the combined data element, associated with the log index value and data statement, is also added to the log dictionary. In some embodiments, the LDG 150 adds the combined data element to the logging dictionary 140.

In some embodiments of the method 300, the associated static data can be selected from the group consisting of: a line number associated with the logging statement in the source code, a file name associated with said logging statement in said source code, a type of variable associated with the logging statement in the source code, a size of the value associated with the logging statement in the source code, and an indication of the number of values in the source code.

In the method 300, in some embodiments, a piece of data is alternatively definable as both: source code static data; and a source code dynamic data. For instance, a line number of a logging statement could be defined as either static information or dynamic information.

In the method 300, dynamic data of said source code is not employed to generate the log index value. Instead, a value associated with the dynamic data is output from the modified source code. In some embodiments, the logging statement includes formatting information.

Although the present invention has been described in detail, those skilled in the art should understand that they can make various changes, substitutions and alterations herein without departing from the spirit and scope of the invention in its broadest form.

What is claimed is:

1. A computer-implemented method to generate a logging dictionary for a compilation of a source code that has a logging statement and associated source code static data, comprising:
  selecting part of said source code that includes said logging statement;
  determining source code static data associated with said logging statement, wherein said associated source code static data includes static variable names, fixed text and fixed formatting information;
  generating a combined data element from said associated source code static data, wherein said combined data element includes said static variable names, said fixed text and said fixed format information;
  wherein if said combined data element does not occur in said logging dictionary correlated to said logging statement:
  assigning a log index value to said combined data element; and adding said log index value, correlated to the logging statement, to said logging dictionary.

2. The method of claim 1, further comprising recording said combined data element, associated with said log index value and said search logging statement, in said log dictionary.

3. The method of claim 1, wherein said associated static data can be selected from the group consisting of:
  a line number associated with said logging statement in said source code,
  a file name associated with said logging statement in said source code,
  a type of variable associated with said logging statement in said source code,
  a type of value associated with said logging statement in said source code, and
  an indication of the number of values in said source code.

4. The method of claim 1, wherein a piece of data is alternatively defineable as both:
    said source code static data; and
    a source code dynamic data.

5. The method of claim 1, wherein source code dynamic data of said source code is not employed to generate said log index value.

6. A computer-implemented method for generating a key index value that correlates to a logging statement and associated source code static data, comprising:
    selecting part of a source code that includes said logging statement;
    determining associated source code static data associated with said logging statement, wherein said associated source code static data includes fixed text, fixed format information and static variable names;
    generating a combined data element from said associated source code static data, wherein said combined data element includes said fixed text, said fixed format information and said static variable names;
    determining a log index value associated with said correlated combined data element and said logging statement;
    enabling a write, to a log, of said log index value in said source code; and generating a modified source code associated with said log index value and a variable name to replace said source code.

7. The method of claim 6, wherein said generating a modified source code includes appending a variable name to said log index value.

8. The method of claim 6, further comprising writing said log index value to a logging dictionary during said generating said modified source code.

9. The method of claim 8, further comprising rewriting said log into human readable form, comprising:
    running an executable filed based on said modified source code; and
    outputting said log index value in a log.

10. The method of claim 9, further comprising:
    outputting dynamic data associated with said log index number.

11. The method of claim 10, further comprising:
    converting said log index value into human-understandable format.

12. The method of claim 6, further comprising:
    deleting said source code static data and said logging statement from said source code.

13. The method of claim 6, wherein said generating a modified source code includes inserting said key index value in said source code.

14. A preprocessor system for modifying source code, comprising:
    a) a logging statement identifier configured to:
        distinguish a logging statement from a source code; and
        parse source code, associated with said source code, further into:
            i) associated source static data that includes static variable names, fixed text and fixed format information, and
            ii) associated static variable name data;
    b) a logging dictionary generator, configured to:
        i) combine said associated source static data and said associated static variable name data to form a combined data element that includes said static variable names, said fixed text and said fixed format information;
        ii) if said combined data element does not occur in a coupled logging dictionary correlated to said logging statement, generate a log index value that acts as a key for said combined data element; and
        iii) store said log index value and said combined data element into said logging dictionary, and
    c) a computer processor.

15. The preprocessor system of claim 14, wherein said logging dictionary generator is configured to enter said log index value and said combined data element into an entry of said logging dictionary associated with said logging statement.

16. The preprocessor system of claim 14, further comprising:
    a logging statement translator configured to replace said associated source static data and said logging statement, with an alternative logging statement that writes the said log index value in said log, to create a modified source code.

17. The preprocessor system of claim 16, wherein said logging statement translator is further configured to compile said modified source code.

18. The preprocessing system of claim 14, wherein said logging dictionary generator is configured to not store a duplicate copy of said log index value and said combined data element associated with said logging statement in said logging dictionary.

19. The preprocessing system of claim 14, wherein said logging dictionary generator is configured to perform said generate and said store if said combined data element does not occur in said logging dictionary correlated to said logging statement.

* * * * *